United States Patent
Baldischweiler et al.

(10) Patent No.: US 9,495,566 B2
(45) Date of Patent: Nov. 15, 2016

(54) METHOD FOR INTERACTION OF A DATA CARRIER WITH AN END DEVICE

(75) Inventors: Michael Baldischweiler, Munich (DE); Dieter Weiss, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 319 days.

(21) Appl. No.: 14/008,737

(22) PCT Filed: Mar. 14, 2012

(86) PCT No.: PCT/EP2012/001142
§ 371 (c)(1),
(2), (4) Date: Sep. 30, 2013

(87) PCT Pub. No.: WO2012/130391
PCT Pub. Date: Oct. 4, 2012

(65) Prior Publication Data
US 2014/0217176 A1 Aug. 7, 2014

(30) Foreign Application Priority Data
Mar. 30, 2011 (DE) .......................... 10 2011 015 571

(51) Int. Cl.
*G06K 19/07* (2006.01)
*G06K 19/077* (2006.01)
(Continued)

(52) U.S. Cl.
CPC ............... *G06K 7/081* (2013.01); *G06F 3/044* (2013.01); *G06F 3/0412* (2013.01);
(Continued)

(58) Field of Classification Search
CPC .. G06F 3/044; G06K 7/081; G06K 19/0702; G06K 19/0723; G06K 19/07703; G06K 19/07705; G06K 19/07707; G06K 19/07743; G06K 19/07756; G06Q 20/352; G06Q 20/354; G06Q 20/3278; G07F 7/0806; G07F 7/0833; G07F 7/084; G07F 7/0846; H04B 5/0012; H04M 1/7258
USPC ........................................ 235/492; 340/572.1
See application file for complete search history.

(56) References Cited

U.S. PATENT DOCUMENTS 6,173,899 B1 1/2001 Rozin
2006/0047971 A1 3/2006 Miyazaki et al.
(Continued)

FOREIGN PATENT DOCUMENTS

CA 2695824 A1 * 2/2009 ........... G07D 7/0073
CN 101819623 A 9/2010
(Continued)

OTHER PUBLICATIONS

International Search Report from corresponding PCT Application No. PCT/EP2012/001142, May 21, 2012.

*Primary Examiner* — Suezu Ellis
(74) *Attorney, Agent, or Firm* — Workman Nydegger (57) ABSTRACT

A method is provided for interaction of a portable data carrier with an end device. The data carrier comprises a transducer arrangement having at least one or a set of capacitive transducer elements which are arranged on or in the data carrier at defined positions in relation to the geometry of the data carrier, at least one contactless interface, and a dedicated energy supply. The end device comprises a capacitive display screen having a touch-sensitive display, wherein the data carrier generates via the capacitive transducer elements signals which, when the data carrier is placed onto the display screen, are picked up by the display screen of the end device and evaluated as input signals through the end device.

19 Claims, 5 Drawing Sheets

(51) Int. Cl.
*G06K 7/08* (2006.01)
*G06F 3/041* (2006.01)
*G06F 3/044* (2006.01)
*G06K 19/067* (2006.01)

(52) U.S. Cl.
CPC ....... G06K 19/067 (2013.01); G06K 19/0702 (2013.01); G06K 19/0723 (2013.01); G06K 19/07707 (2013.01); G06K 19/07756 (2013.01)

(56) References Cited

U.S. PATENT DOCUMENTS

| | | | |
|---|---|---|---|
| 2008/0082452 A1* | 4/2008 | Wankmueller | G06Q 20/04 705/67 |
| 2009/0122026 A1* | 5/2009 | Oh | G06F 1/1613 345/174 |
| 2009/0159713 A1* | 6/2009 | Mullen | G06K 19/06206 235/493 |
| 2011/0279242 A1* | 11/2011 | Krawczewicz | G06K 19/0701 340/10.6 |
| 2011/0284632 A1* | 11/2011 | Mullen | G06Q 20/352 235/380 |
| 2011/0304583 A1* | 12/2011 | Kruglick | G06F 3/044 345/174 |
| 2013/0284578 A1* | 10/2013 | Foerster | G06K 7/081 200/600 |
| 2015/0138142 A1* | 5/2015 | Liao | G06F 3/0488 345/174 |

FOREIGN PATENT DOCUMENTS

| | | |
|---|---|---|
| DE | 102007000874 A1 | 5/2009 |
| WO | 2009-019038 A1 | 2/2009 |

* cited by examiner

METHOD FOR INTERACTION OF A DATA CARRIER WITH AN END DEVICE

BACKGROUND

This invention relates to a method for interaction of a portable data carrier, such as e.g. a chip card, a value document, a bank note having a chip, an identification card, a payment card, an admission ticket or the like, with an end device. An end device is understood to be e.g. a computer, a notebook or laptop, a cash register of a cash register system, or a hand-held unit, such as e.g. a mobile phone, a tablet PC or a checking unit. The invention furthermore relates to a portable data carrier as well as an end device of the above-designated kind. Further, the invention relates to a system for interaction of a portable data carrier with an end device.

Methods are known wherein a security element of a portable data carrier is checked by being placed on a display screen of an end device. WO 2009/019038 A1 describes the check of a data carrier which comprises a window element configured as a light-transmissive region. In the window element an information item is configured in the form of a visible or non-visible structure. For verification of the data carrier there is employed a display screen of a computer, i.e. a conventional PC display screen or the display screen of a hand-held unit. To carry out a verification of the data carrier, the window element with the structure information item configured therein is placed over a certain region of the display screen. On the display screen there is effected a display which is correlated with the structure information item in the window element of the data carrier. Through the superimposition of the two partial information items, a hidden information item becomes visible in the window element of the data carrier, by which the data carrier is verifiable.

The operability of this security concept requires a sufficiently exact superimposition of window element and displayed information item on the display screen. Furthermore, the described procedure is not suited for finding the kind or the type of the data carrier to be verified in automated fashion. If the data carrier is for example a bank bill having a window element, it is unknown to the end device which bank bill is lying on the display screen for verification.

CN 101819623 A discloses a storage data carrier having an IC which has a set of capacitive connecting points by means of which it can be read out by a reading device having a touch-sensitive display screen. One pair of connecting points serves for supplying energy to the data carrier, a further pair for the readout of information stored on the data carrier through the reading device. This solution simplifies the handling of a storage data carrier upon the readout of information. However, the realization of a capacitive energy supply is elaborate.

SUMMARY

It is an object of the present invention to state a method that solves the above-mentioned problems and simultaneously enables a greater flexibility upon the interaction of a portable data carrier with an end device. A further object of the present invention is to state a data carrier and an end device that enable a flexible and secure interaction with each other.

These objects are achieved by a method according to the features of claim 1 as well as a data carrier, an end device and a system according to the features of the further independent claims. Advantageous embodiments can be found in the dependent claims.

The invention provides a method for interaction of a portable data carrier with an end device having a capacitive display screen. A portable data carrier is understood here to be in particular a chip card, a value document, a bank note having a chip, an identification card, a payment card, an admission ticket and the like. An end device for the purposes of the invention is e.g. a computer, a notebook or laptop, a hand-held unit, such as e.g. a mobile radio device, a tablet PC, a cash register of a cash register system, etc.

The interaction preferably occurs, on the one hand, in such a way that an end device determines the exact position of a data carrier on the display screen and generates a display which is exactly coordinated with said position. There can thus be effected for instance a textual display whose alignment corresponds exactly to that of a principal axis of a data carrier.

In a preferred embodiment, there is further set up within the framework of the interaction a back channel from an end device to a data carrier via which the end device can send data to the data carrier, so as to enable a bidirectional communication between a data carrier and an end device.

The data carrier comprises a transducer arrangement having at least one or a set of capacitive transducer elements which are arranged on or in the data carrier at defined positions in relation to the geometry of the data carrier.

A transducer element of the data carrier is understood to be an additional capacitive area which is connected to a drive apparatus configured as an integrated circuit (integrated chip, IC). Driving the transducer elements enables signals to be generated which are picked up and evaluated as input signals by the display screen of the end device. By the transducer elements being operated as sensors, and the display screen being suitably driven, a back channel can be set up from an end device to a data carrier.

The data carrier further comprises an interface for communication with an end device, preferably a contactless interface. In particular in the embodiment as a bank note, the interface is preferably configured as a purely contactless interface.

The data carrier further comprises a dedicated energy supply, which makes available, inter alia, the energy for operating the transducer arrangement. The energy supply works independently of the transducer arrangement. It is expediently configured in the form of an autonomous energy supply, e.g. as a battery, or is effected via the contactless interface.

The data carrier can also comprise an additional contact-type interface. Such data carriers having a contact-type and a contactless interface are designated dual-interface data carriers; they typically comprise a contact pad and a coil.

The end device comprises a capacitive display screen having a touch-sensitive display. Display screens of this kind are now widespread, being used primarily in high-performance mobile phones ("smart phones") or in tablet PCs. Capacitive display screens utilize the rate of change of applied voltages on respective sensor areas of the display screen. The surface of a glass substrate of the display screen consists here of capacitors which change their value depending on the touch of the finger. This change is ascertained and converted into coordinates of the display screen by a logic coupled with the display screen.

According to the invention, the data carrier generates signals via the capacitive transducer elements, which signals, when the data carrier is placed onto the display screen, are picked up by the display screen of the end device and evaluated as input signals through the end device. Through evaluation of the signals of the transducer elements the end device derives the exact position of the data carrier on the display screen and performs at least one action which is based on the knowledge of the exact position of the data carrier on the display screen. The energy for driving the transducer elements is made available here via a contactless interface or stems a dedicated energy supply of the data carrier.

The invention further provides a data carrier for interaction with an end device. The data carrier comprises a transducer arrangement having at least one or a set of capacitive transducer elements which are arranged on or in the data carrier at predefined positions in relation to the geometry of the data carrier. Further, the data carrier comprises at least one contactless interface and a dedicated energy supply.

The data carrier can be present in the form of a dual-interface card, in which case it additionally has a contact-type interface besides the contactless interface. It can also be provided to equip the data carrier with an NFC unit for a near-field communication (NFC), which, besides making available a data transfer channel, can also serve to supply energy to the components of the data carrier.

The invention further provides an end device for interaction with a data carrier according to the invention. The end device, e.g. a computer, a laptop or notebook, a tablet PC, a mobile phone, a cash register of a cash register system, etc., is configured for deriving the exact position of the data carrier on the display screen through evaluation of the signals of the transducer elements of the data carrier according to the invention.

Further, the invention proposes a system for interaction of a portable data carrier with an end device, which system comprises at least one data carrier according to the invention as well as at least one end device according to the invention.

In an embodiment that is especially easy to realize technically, the data carrier comprises a contact-type interface having several contact pads. According to this embodiment, the data carrier is configured as a dual-interface data carrier. The contact pads of the contact-type interface are employed according to the invention as capacitive transducer elements on which the signals for the display screen are generated. This requires that the data carrier is placed onto the display screen with the contact-type interface downward, so that signals of the contact pads serving as capacitive transducer elements can be detected and evaluated as input signals by means of the capacitive display screen of the end device.

Selectively, the capacitive transducer elements are driven individually or jointly. The transducer elements are arranged at defined positions in relation to the geometry of the data carrier. The transducer elements can be provided so as to be distributed over the area of the data carrier. They can likewise be provided on or in the data carrier in a spatially concentrated manner and, in relation to individual components, in a defined manner relative thereto.

For driving the transducer elements, a drive apparatus causes changes of charge, in particular in an order of magnitude in a range from 2 pF to 1 nF, on the transducer elements. The energy required for driving the transducer elements is taken from the data carrier's internal energy supply or transmitted from the end device through the contactless interface via inductive coupling. A sufficient energy supply is reliably obtained here with known end devices, such as mobile radio end devices, tablet PCs and the like, even when the antenna of the end device is arranged on the side of the end device facing away from the display screen.

In a further expedient embodiment, the data carrier comprises a window element in relation to which the transducer elements are arranged at predefined positions on or in the data carrier. A window element is understood here to be a light-transmissive region, as is described in WO 2009/019038 A1 from the applicant. The content of this print is incorporated in the description of this invention by reference. According to the definition given in WO 2009/019038 A1, a first information item is arranged in the light-transmissive region. A second information item is displayed at least in certain regions in the separate display screen of the end device. Either in the first or the second information item or also in both information items there is hidden a further information item which is not, or only hardly, recognizable and/or readable for a viewer without auxiliary means. A verification of the data carrier is effected by the first information item in the translucent region of the data carrier being laid over the second information item of the display screen and the hidden information item becoming recognizable and/or readable as a pattern and/or as a metamerism.

In the method according to the invention it is provided that the end device derives the exact position of the data carrier on the display screen through evaluation of the signals of the transducer elements, and outputs on the display screen a content information item which is correctly positioned relative to the data carrier and the window element. An advantage of this procedure is that the superimposition of window element of the data carrier and display on the display screen now no longer needs to be performed manually. Instead, the position of the window element with the first information item contained therein is ascertained automatically by the display screen on the basis of the transducer elements arranged in a defined manner in relation to the window element. The superimposition of first and second information items in the window element and the display screen can thus be effected more precisely.

The signals generated on the display screen of the end device can involve content information items. They allow the end device in particular to derive the exact position of the data carrier or of the window element arranged in the data carrier. On the basis of the ascertained position of the window element, the end device can generate on its display screen a display that is in exactly correctly positioned relative to the window element. With a data carrier having a window element, the existence of a correctly positioned display constitutes for a user an essential feedback that the data carrier and the display screen or end device work together. With bank notes having a window element, the display allows in particular an authenticity check. The necessary, end-device-side adjustment to the data carrier can be effected through corresponding software, for instance through the storing of applets (i.e. a corresponding application).

In a further embodiment, there is effected via the transducer elements a signal exchange from the display screen to the data carrier, by the transducer elements being operated as sensors and signals being generated location-dependently through the display screen, which signals are detected by the transducer elements operated as sensors and are evaluated as input signals through the data carrier. This enables a back channel to be realized from the end device via its display screen to the data carrier. The transducer elements 11, 12, 13, 14 can, in so doing, be individually addressed and thus a fast and more complex signal transmission be realized.

In an especially simple embodiment of the back channel, the latter can be realized by the capacitive drive of the display screen of the end device being switched on and off as a whole and these switch-on and -off operations being detected by the transducer elements. In so doing, the display screen can remain activated for displaying information, only the drive for user input being deactivated. The actual signal transmission can be realized here e.g. through the ratio of switch-on time to total duration of a specified time unit, with switch-on times smaller than a certain reference value being rated e.g. as logical "0" and switch-on times greater than the reference value as logical "1", thereby enabling signals to be transmitted from the end device to the data carrier.

The back channel can, in an advantageous alternative embodiment variant, also be realized through cooperation of an acceleration sensor formed in the data carrier with a vibration apparatus configured in the end device and acting on the display screen. Through corresponding drive of the vibration apparatus there is generated a signal which is detected by the acceleration sensor.

The set-up of the back channel on the end device can frequently be advantageously effected through a software adjustment, without any hardware changes being required. For example, an applet can be made available for this purpose in the data carrier, the applet being transferred from the data carrier to the end device. The use of the back channel from the end device to the data carrier is of practical importance in particular for data carriers configured as cards, such as e.g. payment cards, admission tickets, value cards, etc.

In an advantageous development, the data carrier according to the invention is equipped with a consent apparatus which has the effect that a signal transmission between data carrier and display screen, when the data carrier is placed on, is effected only when a user confirms it through a certain action. Expediently, the consent apparatus can comprise in particular a back contact area via which a user closes a circuit by simultaneously touching an outside contact area connected to the display screen, the closed circuit being a requirement for the possibility of changes of capacitance between data carrier and display screen and thus for a signal transmission.

Besides a fast and exact check of the authenticity of a data carrier, in particular a bank note, by means of an end device configured as a checking unit, the method according to the invention allows a number of basic value transactions. As described in the introduction, these require the data carrier to be placed onto the capacitive display screen of the end device.

In a first variant, for carrying out a security-critical transaction on the end device, transactions are transferred to a computer which encrypts the transaction data as an image with a key specific to the data carrier and transfers them to the end device together with a transaction number via a separate channel, the image-encrypted data being displayed on the display screen of the end device. The separate channel can be e.g. an SMS (short message service). Expediently, a decryption of the image-encrypted data is effected only in the case of correctly positioned superimposition of the window element with the image-encrypted data displayed on the display screen.

For carrying out the value transaction according to the first variant there is required a data carrier according to the invention having a transducer arrangement and an optional window element.

In a second transaction variant, the data carrier does not need to have a window element. For carrying out a security-critical transaction on the end device according to a second variant, transaction data are transferred from the end device to the data carrier via the contactless interface.

In an alternative, third variant using a data carrier having a transducer arrangement and a back channel, for carrying out a security-critical transaction on the end device, transaction data are transferred to the data carrier via the transducer elements of the data carrier.

In the second and third variants it can further be provided that through the data carrier a transaction number specific to the transaction is generated and transferred selectively via the contactless interface or the transducer elements to the end device, which transfers the transaction data together with the transaction number to a computer for further processing, in particular via a secure channel.

If the data carrier has a window element, the latter can be utilized in a simple manner for proving the operability of the data carrier, by e.g. the transaction data rendered on the display screen of an end device being so aligned that they appear exactly in the window element of the data carrier. Such an alignment is possible independently through the data carrier only when the transducer elements of the data carrier driven through the data carrier function properly. This functionality then constitutes proof that the data carrier is working in the expected manner.

The transfer of the transaction data can be effected here via the contactless interface, e.g. via the NFC interface. Via the back channel there is effected an authentication between the data carrier and the end device.

In a further variant, an authentication between the data carrier and the end device can also be effected via the contactless interface, e.g. the NFC interface. If a data carrier has an NFC interface, the latter can be provided in addition to another contactless interface. The two described variants are expedient in particular when the end device has a specially secured runtime environment. Such a secure runtime environment of a data carrier is e.g. the operating system MobiCore from the applicant, which is employed in secure runtime environments of data carriers. As a secure runtime environment there can be employed e.g. an ARM® Trust Zone®.

BRIEF DESCRIPTION OF THE DRAWINGS

The invention will hereinafter be explained more closely on the basis of exemplary embodiments. The representations in the figures are schematized for the sake of better comprehension and do not reflect the actual conditions. In addition, the described embodiments are reduced to the essential core information for the sake of clarity. The proportions shown in the figures likewise do not correspond to the relations existing in reality and serve solely to improve the clearness. There are shown.

DETAILED DESCRIPTION OF VARIOUS EMBODIMENTS

Figure 1:
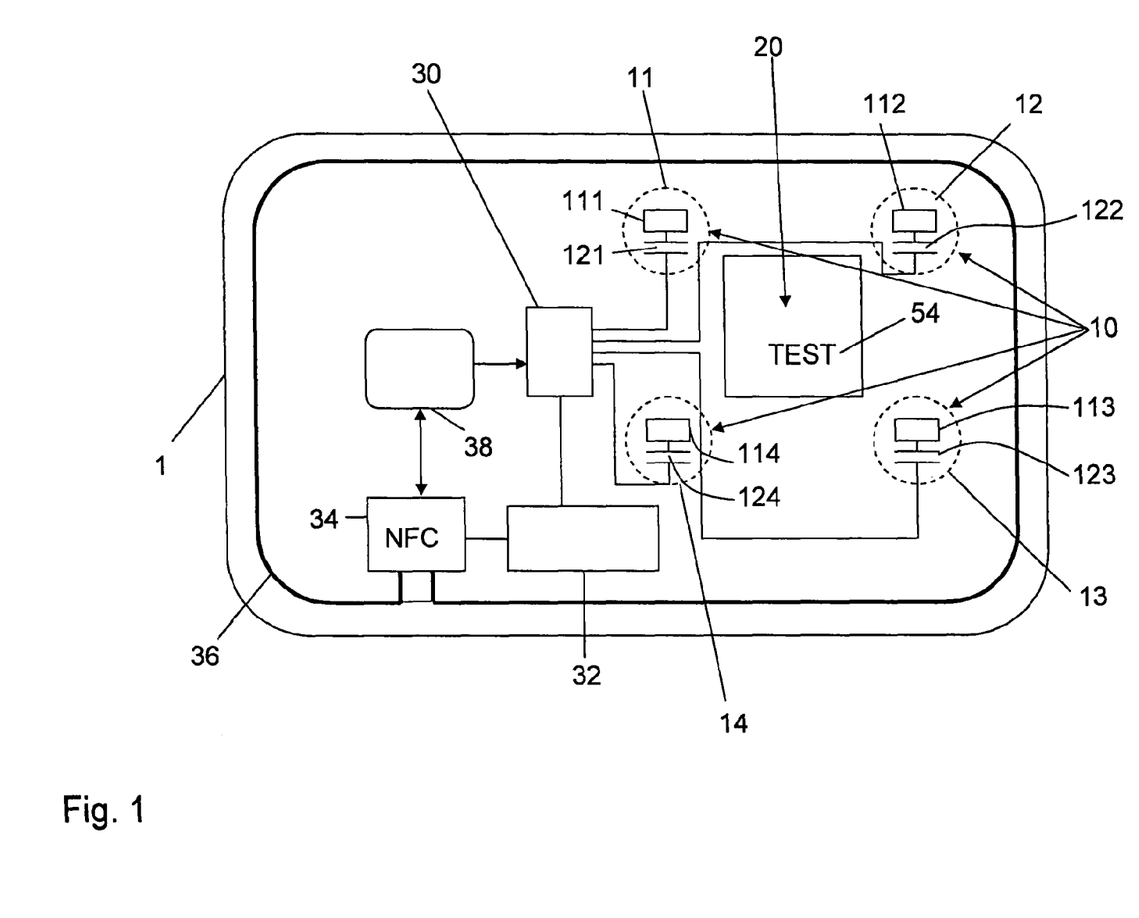
FIG. 1 a schematic representation of a data carrier according to the invention in the form of a card, FIG. 2 a schematic partial representation of an end device having the elements essential to the invention, FIG. 3 a data carrier according to the invention in the form of a bank note, FIG. 4 a schematic representation of the sequence of a value transaction while employing the method according to the invention, and FIG. 5 a schematic representation of a consent apparatus.

FIG. 1 shows a first exemplary embodiment of a portable data carrier 1 according to the invention. The portable data carrier 1 is basically a computer with a reduced overall size and range of resources, which has a microcontroller and at least one interface for communication with an external device. It frequently possesses no, or only a rudimentary, dedicated user data output. The microcontroller typically possesses an overall size of a few mm$^2$ and, through its small overall size alone, is greatly limited in its performance both in terms of data processing power and in terms of storage capacity in comparison with conventional PCs. Its outer construction form is so designed that it can be easily carried by a user at any time. Typical embodiments of a portable data carrier are for instance a chip card (card), a payment card, an admission ticket or the like. The portable data carrier can also be realized in the form of a bank note, a passport or another value document.

In a first embodiment, the data carrier 1 is configured by way of example as a so-called dual-interface card and has a contactless as well as a contact-type interface for communication with an end device (not represented in FIG. 1). The contactless interface is represented by an antenna 36 and an NFC (near field communication) circuit (chip) 34. The reference sign 38 designates a contact element of the contact-type interface. In its proper function the contact element is basically irrelevant for the employment of the data carrier 1 as proposed here, however.

Reference sign 32 represents a unit for supplying energy to the data carrier. In the exemplary embodiment of FIG. 1 it derives its energy from the NFC chip 34. That is to say, the energy supply is effected inductively via the antenna 36. Alternatively, the energy supply 32 can also be configured in the form of an autonomous energy source, e.g. through a battery or through an accumulator. Likewise, the energy supply 32 can be formed through a solar cell which can be driven through ambient light or in particular through light emitted by a display screen of an end device; the light emission through an end device can be effected for the solar cell in a targeted manner, e.g. through generation of light flashes. Between the NFC chip 34 and the contact element 38 a data exchange can take place. If a battery, an accumulator or a solar cell is used, there is no need for a contactless interface insofar as it serves for energy transmission.

The data carrier 1 further comprises a transducer arrangement 10 having at least one capacitive transducer element, there being provided four capacitive transducer elements 11, 12, 13, 14 by way of example in the embodiment shown in FIG. 1. The transducer elements 11, 12, 13, 14 respectively comprise, on the one hand, a capacitor 121, 122, 123, 124 having two capacitive areas, one of which is respectively connected to a drive apparatus 30; on the other hand, the transducer elements 11, 12, 13, 14 respectively comprise a contacting area 111, 112, 112, 114. In a first embodiment, the contacting area 111, 112, 112, 114 is arranged directly on an upper side of the data carrier 1, so that, when the data carrier 1 is placed on, there is a direct contacting with the surface of the glass substrate of the display screen 52. In an alternative embodiment, a protective foil is arranged over the contacting area.

The drive apparatus 30 can be realized e.g. as part of a single chip controller for chip cards or be configured as a separate component. It is connected to the energy supply 32. The drive apparatus 30 can influence the charge state of the transducer elements 11, 12, 13, 14 in a targeted manner and in particular supply energy. It draws the required energy from the energy supply 32. The transducer elements 11, 12, 13, 14 are arranged in or on the data carrier 1 at defined positions in relation to the geometry of the data carrier 1, but also in relation to a window element 20 optionally provided in the data carrier 1. By way of example the transducer elements 11, 12, 13, 14 are placed around the window element 20 in FIG. 1. The number and arrangement of the transducer elements 11, 12, 13, 14 can also deviate from the shown representation.

In the embodiment shown in FIG. 1, separate transducer elements 11, 12, 13, 14 are represented. However, in the dual-interface card illustrated by way of example, the contact pads—not specifically represented—of the contact element 38 could also be employed especially advantageously as contacting areas of the transducer elements 11, 12, 13, 14.

The transducer elements 11, 12, 13, 14 can selectively be driven individually or jointly, the drive being dependent on the employment of the data carrier.

Figure 2:
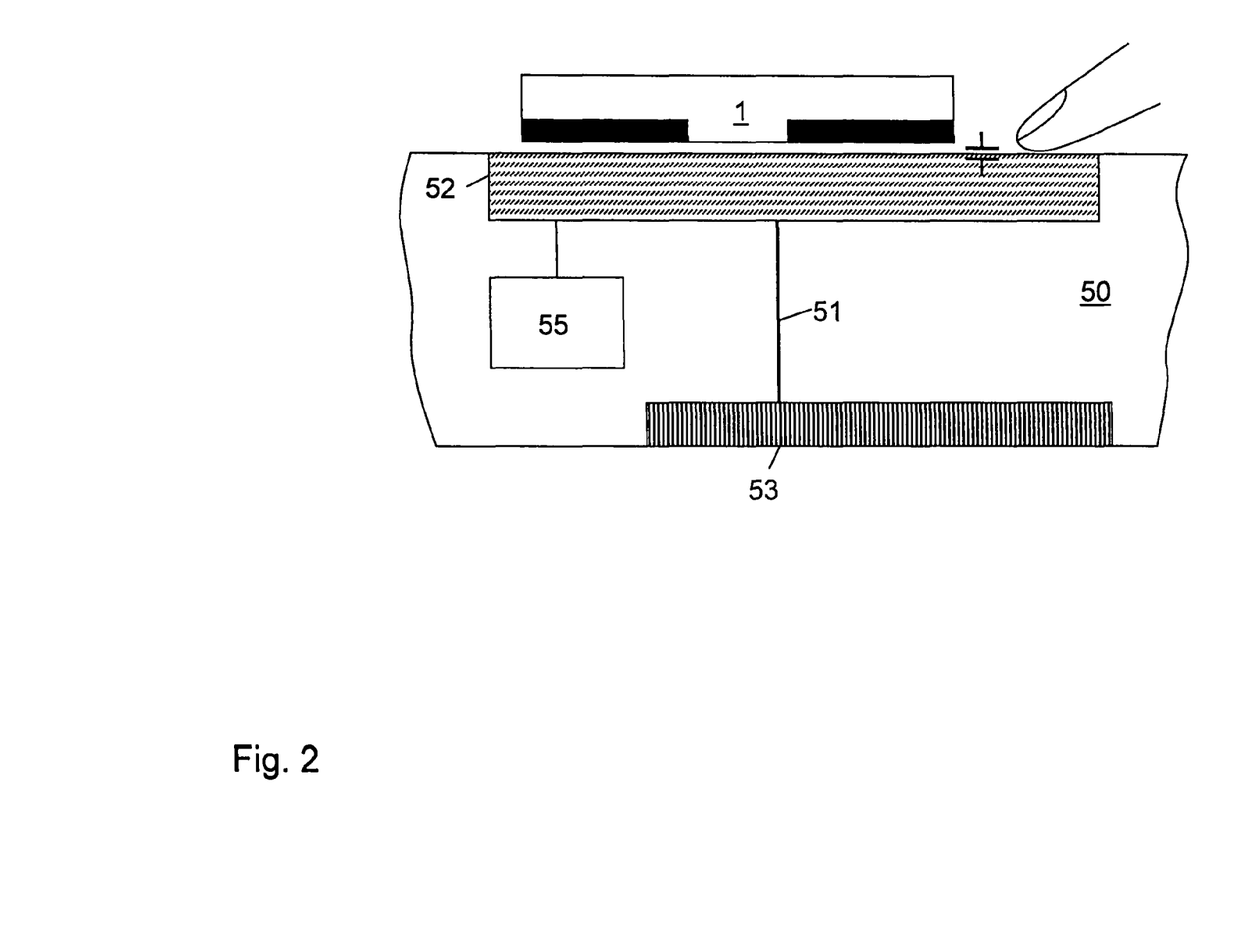

The data carrier represented in FIG. 1 interacts with a capacitive display screen 52 of an end device 50 whose basic elements relevant here are represented very schematically in FIG. 2. The capacitive display screen 52 is driven by a display screen control unit 55. The display screen control unit 55 at the same time evaluates capacitive changes between the display screen 52 and an opposing element, in particular a finger or a transducer element of a data carrier 1, as indicated by the capacitor symbol. It can further be provided that the capacitive display screen 52 is connected electrically via a suitable connection 51 to an outside contact area 53, which lies on an outer side of the end device 50 such that it can be touched by a user. The outside contact area 53 can be realized in a simple manner through a metallic housing of an end device 50, and the connection 51 can be effected through mounting means or connection means. Many end devices 50 have a corresponding device, without it having to be specially set up. End devices 50 regularly have further parts and components which are not important to the invention described here, and therefore not shown.

The end device 50 can be e.g. a publicly accessible terminal. In addition, the end devices 50 may, however, also generally be computers, laptops, netbooks, tablet PCs, mobile radio end devices, PDAs and the like, which are meanwhile frequently equipped with capacitive display screens 52.

In a capacitive display screen 52 the display screen surface is continuously scanned for capacitive changes with high local resolution. For this purpose a suitable known method is used. According to one known method, test signal sequences consisting of signal packets with different amplitudes are generated location-dependently under the control of the display screen control unit 55. Changes of the test signal sequences through external influences, in particular through capacitive influencing through finger touch, are detected by the display screen control unit 55. Such a change can also be caused through the transducer elements 11, 12, 13, 14 represented in the data carrier 1, there being added to an existing capacitor value of the capacitive display screen 52 a further one through the transducer elements 11, 12, 13, 14.

According to the invention, the data carrier 1 generates signals via the capacitive transducer elements 11, 12, 13, 14, which signals, when the data carrier is placed onto the display screen 52, are picked up by the display screen 52 of the end device 50 and evaluated as input signals through the end device 50.

In so doing, the data carrier 1 is placed onto the display screen 52 such that the contacting areas 111, 112, 112, 114 of the transducer elements 11, 12, 13, 14 lie directly on the display screen 52. The drive of the transducer elements 11, 12, 13, 14 is effected by the drive apparatus 30 causing minimal changes of charge in the connected capacitive areas of the transducer elements 11, 12, 13, 14, and thus minimal changes of capacitance of the transducer elements 11, 12, 13, 14, through a controlled supply of energy from the energy supply 32. The order of magnitude of the changes of charge expediently lies in a range of 2 pF to 1 nF, but changes of charge of less than 2 pF up to 1 pF are also already technically exploitable. In principle, greater values support the quality of the signal transmission, while smaller values enable smaller construction forms and are suited in particular e.g. for realizing the invention in bank notes. The energy for driving the transducer elements 11, 12, 13, 14 can be obtained by the data carrier 1 from the end device 50 via the antenna coil 36. A sufficient energy supply is obtained even when the end-device-side antenna is arranged on the device's back side facing away from the display screen 52.

The end device 50 detects e.g. by means of test signal sequences, as explained hereinabove, the changes of charge caused in the transducer elements 11, 12, 13, 14 and ascertains therefrom the exact position of the transducer elements 11, 12, 13, 14 on the display screen 52. Because the transducer elements 11, 12, 13, 14 are arranged at a given distance or in a given position relative to the window element 20, the end device can ascertain the exact position of the window element 20 or the exact position of the data carrier 1 on the display screen on the basis of this information. For carrying out the determination of position there can be provided in the end device 50 a corresponding software application, e.g. an applet, which is executed by the display screen control unit 55.

It can be provided that graphical or alphanumeric control information output on the display screen 52 displays to the user in which direction the data carrier 1 must be shifted relative to a current position of the data carrier 1 in order that a position determination can be effected.

That the detection of the position of the data carrier 1 on the display screen 52 has been successfully carried out is communicated to the user. For this purpose, the transducer elements 11, 12, 13, 14 can e.g. be activated successively e.g. in the clockwise direction and there can be provided e.g. a text output coordinated with the window element 20 and representing an information item 54 shown in the display screen 52, in FIG. 1 for instance the word "TEST". Upon successful detection of position the shown information item 54, i.e. for instance the word "TEST", jumps into the region of the window element 20 in correct orientation. The orientation was ascertained from the activation sequence of the transducer elements, in the clockwise direction.

The actual signal transmission can be realized here e.g. by the ratio of switch-on time to the total duration of a specified time unit, e.g. a switching period, with switch-on times smaller than a certain reference value being rated e.g. as logical "0" and switch-on times greater than the reference value as logical "1". Through an even more exact resolution of the ratio of switch-on time to time unit it is further possible to individually identify single transducer elements 11, 12, 13, 14. Then it is possible to unambiguously recognize e.g. a transducer element arranged on the top right in plan viewing on the basis of a certain longer or shorter ratio of switch-on time to time unit, so that a determination of the orientation of a data carrier 1 is unambiguously possible even when an even number of transducer elements is arranged point- or axisymmetrically on the data carrier.

In an alternative possible embodiment, the word "TEST" could rotate in the clockwise direction within the window element 20. The shown information item 54 is of course not limited to representations of words, but can be an arbitrary graphical representation; the rendition can of course also be effected statically.

In a very advantageous development of the invention it can be provided that there is set up between display screen 52 and data carrier 1 via the transducer elements 11, 12, 13, 14 a back channel via which channel the end device 50 transmits signals to the data carrier 1.

A back channel can be realized by the transducer elements 11, 12, 13, 14 being operated as sensors and the display screen 52 being suitably driven. In this case the drive apparatus 30 is configured to detect the charge states or changes of capacitance of the transducer elements 11, 12, 13, 14 and to evaluate them as input signals. In a first embodiment of the back channel, location-related signals are generated for a data carrier 1 placed on the display screen 52 through corresponding drive of the test signal sequences. For the formation of the test signal sequences the previously recognized position of the data carrier 1 is utilized. The transducer elements 11, 12, 13, 14 can in this way be individually addressed and thus a fast and more complex signal transmission be realized. The signals are detected by the data-carrier-side transducer elements 11, 12, 13, 14 operated as sensors.

Alternatively, the back channel can be realized e.g. by the display screen 52 being switched on and off as a whole and this being detected by the drive apparatus 30 via the transducer elements 11, 12, 13, 14. The actual signal transmission can be realized here e.g. by the ratio of switch-on time to the total duration of a specified time unit, with switch-on times smaller than a certain reference value being rated e.g. as logical "0" and switch-on times greater than the reference value as logical "1".

The set-up of the back channel on the end device 50 can be effected through software, e.g. through an applet installed on the end device 50. The software can also be made available by the data carrier 1 and be transferred from the latter to the end device 50.

In an alternative embodiment, the back channel is realized through the cooperation of a vibration apparatus and an acceleration sensor. Vibration apparatuses are known for end devices, being frequently used there for alarming a user. Acceleration sensors are likewise known for data carriers, where they serve e.g. for ascertaining changes of position in space. For realizing a back channel, the data carrier 1 is equipped with an acceleration sensor, and the end device 50 with a vibration apparatus. The latter is driven e.g. intermittently through corresponding software, with a signal transmission being effected through the ratio of on and off times.

To ensure that the placing of a data carrier 1 onto a display screen 52 is effected by a user, in a further development a change between "touched" and "not touched" can also be evaluated using software or a software extension of an end device 50. As a result it can be ensured that a user has actively placed a data carrier 1 onto a display screen 52, for instance onto a display screen 52 of a cash register device or payment device. This method makes a relay attack impossible.

Figure 5:
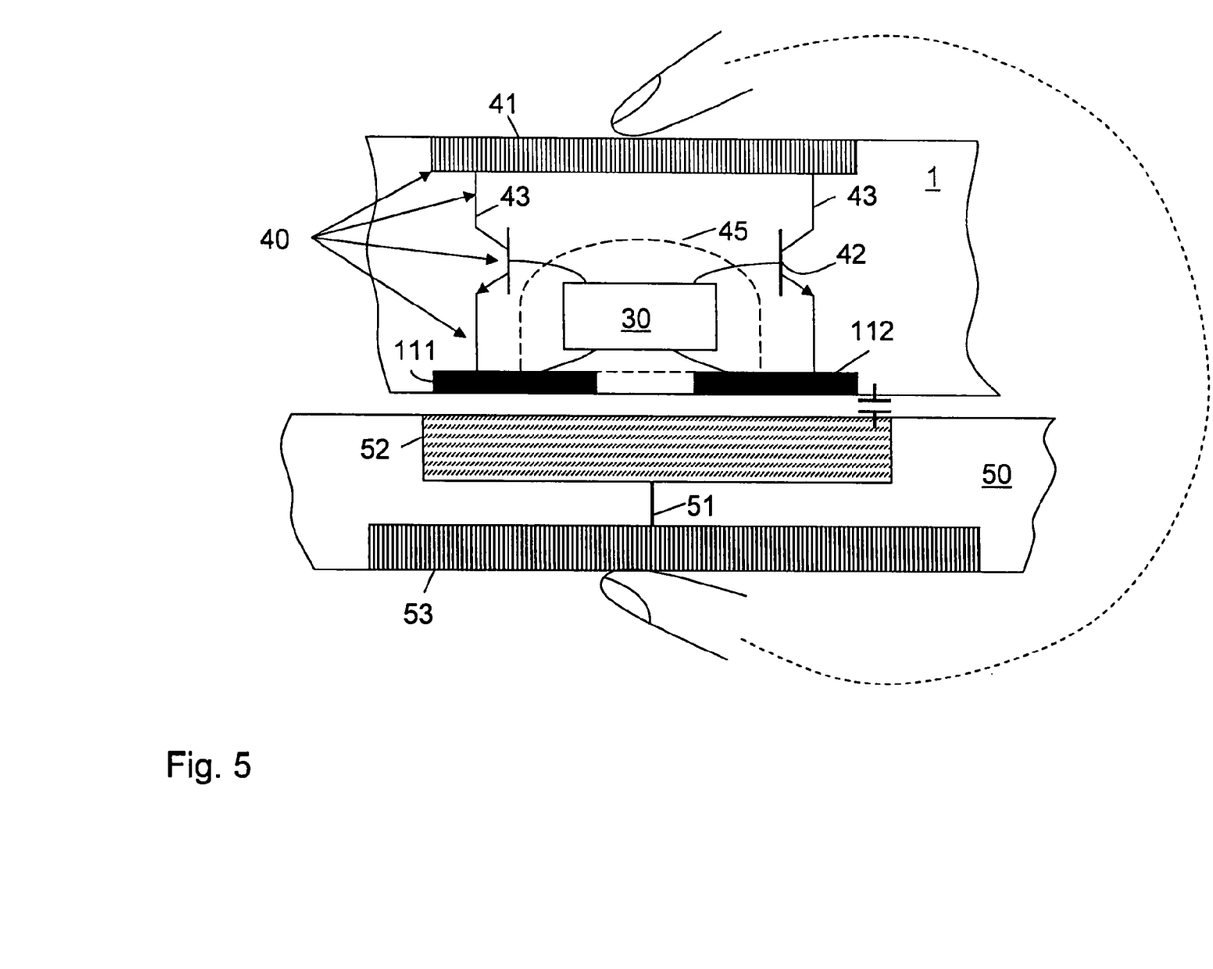

To ensure that a data exchange between a data carrier 1 and an end device 50 is effected deliberately, in an embodiment variant the data carrier 1 can have a consent apparatus 40, as is represented schematically in FIG. 5. It comprises at least one back contact area 41 which is formed on the back side of the data carrier 1 facing away from the transducer elements 111, 112, at least one electrical switch 42 which is connected to the drive apparatus 30, and an electrical connection 43, guided across the switch 42, between the back contact area 41 and at least one of the transducer elements 111, 112.

The back contact area 41 can be based e.g. on graphite or carbon black, or consist of a conductive polymer, and expediently possesses a moderate electrical conductivity with a resistance of <100 kΩ. The switch 42 is expediently a transistor, a FET, a relay or a similar component. It can be configured as a separate component or as an integrated part of the microcontroller of the data carrier 1. The electrical connection 43 can be realized e.g. by means of wires. One back contact area 41 can be connected to one or several transducer elements 111, 112 via one or several switches 42, or there can also be provided several back contact areas 41 which are respectively connected to one or several transducer elements 111, 112 via an associated switch 42. The transducer elements 111, 112 basically correspond in number and arrangement to the transducer elements 11, 12, 13, 14 according to FIG. 1 but, unlike them, respectively comprise only one contacting area 111, 112 which is connected to the switch or switches 42; the transducer elements 111, 112 do not possess an additional capacitance like the transducer elements 11, 12, 13, 14. The respective second capacitive area for realizing a capacitance is formed by the display screen 52. When the data carrier 1 is configured as a contact-type chip card, the contacting areas 111, 112 are for example expediently realized by the contact areas already present. The drive apparatus 30 can be surrounded by an encapsulation 45 into which further ones of the stated components 42, 43, 111, 112 can also be wholly or partly embedded.

The end device 50 has an outside contact area 53 which is electrically connected to the display screen 52 via a suitable connection 51.

The consent apparatus 40 functions as follows. In order that the drive apparatus 30 can cause a change of the charge state of the transducer elements 111, 112, it must drive the switch or switches 42. Moreover, an electrical transition must be possible between transducer elements 111, 112 and display screen 52. This requires a circuit with the transducer elements 111, 112 to be closed via the back contact area 41, the end device 50 and the display screen 52. For this purpose the user must physically touch the back contact area 41 of the data carrier 1, on the one hand, and simultaneously an outside contact area 53 of the end device 50 connected to the display screen 52, on the other hand. Via the user's body a circuit is then closed, as indicated by the dash line, thereby enabling a charge flow between the transducer elements 111, 112 and the display screen 52, and thus changes of charge.

A data carrier 1 configured as described hereinabove enables a data transfer between the data carrier 1 and an end device 50 which is based on the principle of generating via the capacitive areas of the transducer elements 111, 112 electrical sinks which can be equated with a touch by a finger. The contacting areas of the transducer elements 111, 112 behave passively—i.e. they are high-ohmic—on the capacitive area of the display screen 52 as long as they are not connected to a fixed potential. As long as the transducer elements 111, 112 are not actively driven by the drive apparatus 30, they are in so-called tri-state. If the data carrier 1 possesses for instance contact elements, on the one hand, and a contactless interface, on the other hand, and the data carrier 1 is in contactless operation, all inputs realized via the contact elements are in tri-state. Using software it is possible via the switches 42 for the drive apparatus 30 to switch the contacting areas of the transducer elements 111, 112 to a fixed reference point—and thus end the tri-state.

Through the change between the two states a data carrier 1 lying on the capacitive display screen 52 of an end device 50 can apply changing signal levels on the contacting areas. These level changes are rated as a finger touch by the capacitive display screen 52 and reported to the end-device-side evaluation unit, i.e. for instance the display screen control unit 55. A signal transmission can then in turn be realized for example via the ratio of switch-on time to a certain time unit.

For verifying a represented information item there can be employed e.g. the method described in WO 2009/019038 A1.

FIG. 2 shows a second exemplary embodiment of a data carrier 1 according to the invention in the form of a bank note or bank bill. By way of example there is schematically represented a bill with a denomination 20, which can basically be for instance a 20 euro bill, as indicated. The bank bill likewise comprises a window element 20 around which four transducer elements 11, 12, 13, 14 are again arranged merely by way of example. As in the preceding exemplary embodiment, the transducer elements 11, 12, 13, 14 are connected to a drive apparatus 30. The latter is coupled directly to an antenna 36 in the bank bill in order to make available a wireless communication interface as well as an energy supply for the drive apparatus 30. The circuit in a bank bill is thus constructed such that an energy withdrawal is effected directly and without decoupled voltage supply of an NFC field of an end device. This is possible because no independent NFC communication needs to be effected. The drive apparatus is so constructed that a certain information sequence is effected on the transducer elements 11, 12, 13, 14 per bank bill. For example, a switching element can alternately switch on and off the capacitance of a transducer element and thus its contact area.

Equipping a bank note with a window element 20 and a transducer arrangement 10 allows a fast and very exact check of the authenticity of a bank note using a corresponding checking unit.

Equipping a data carrier with a transducer arrangement described according to the invention and optionally a window element allows a number of basic electronic transactions. The solution according to the invention is suitable, inter alia, for executing transactions in which a data carrier 1 communicates with an end device 50 in order to carry out an electronic transaction via the end device 50 e.g. with a server connected via a basically insecure data network.

Figure 3:
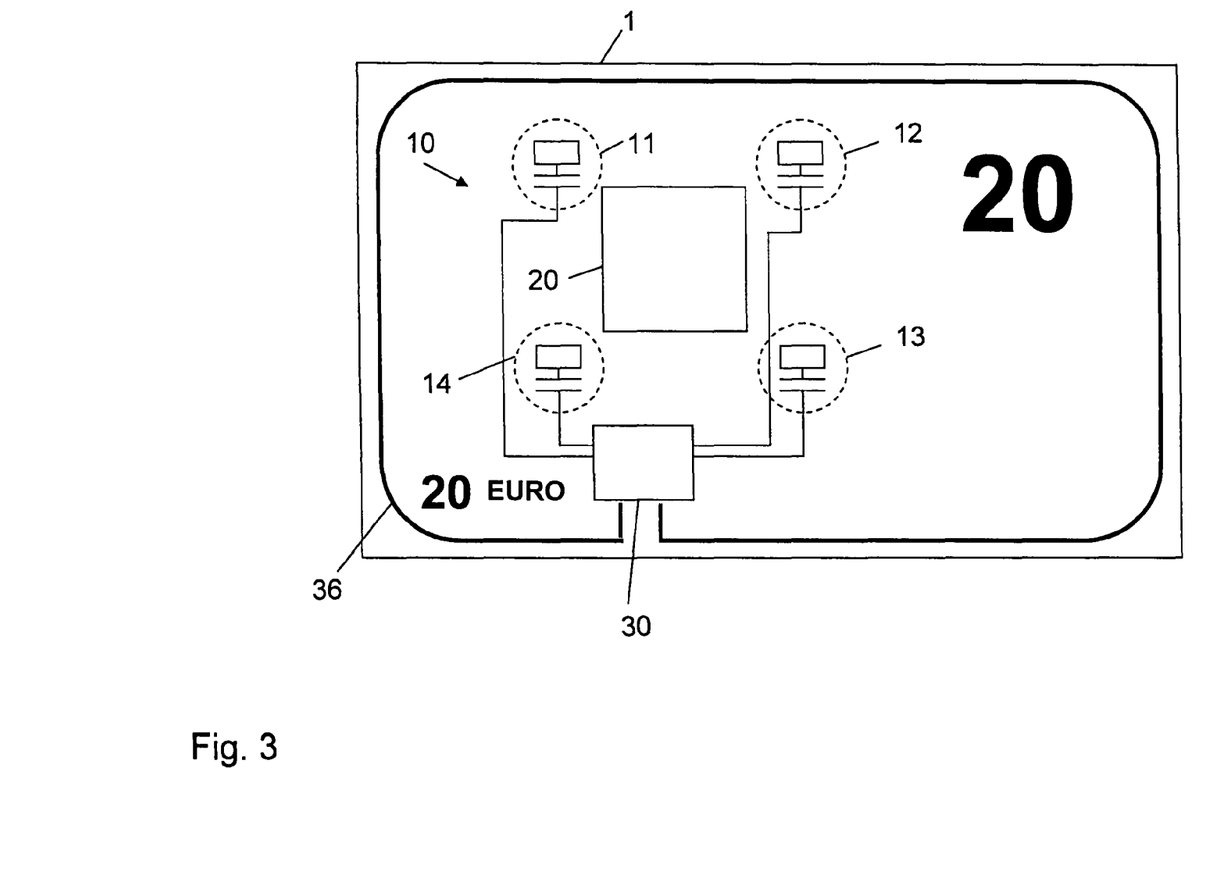
Figure 4:
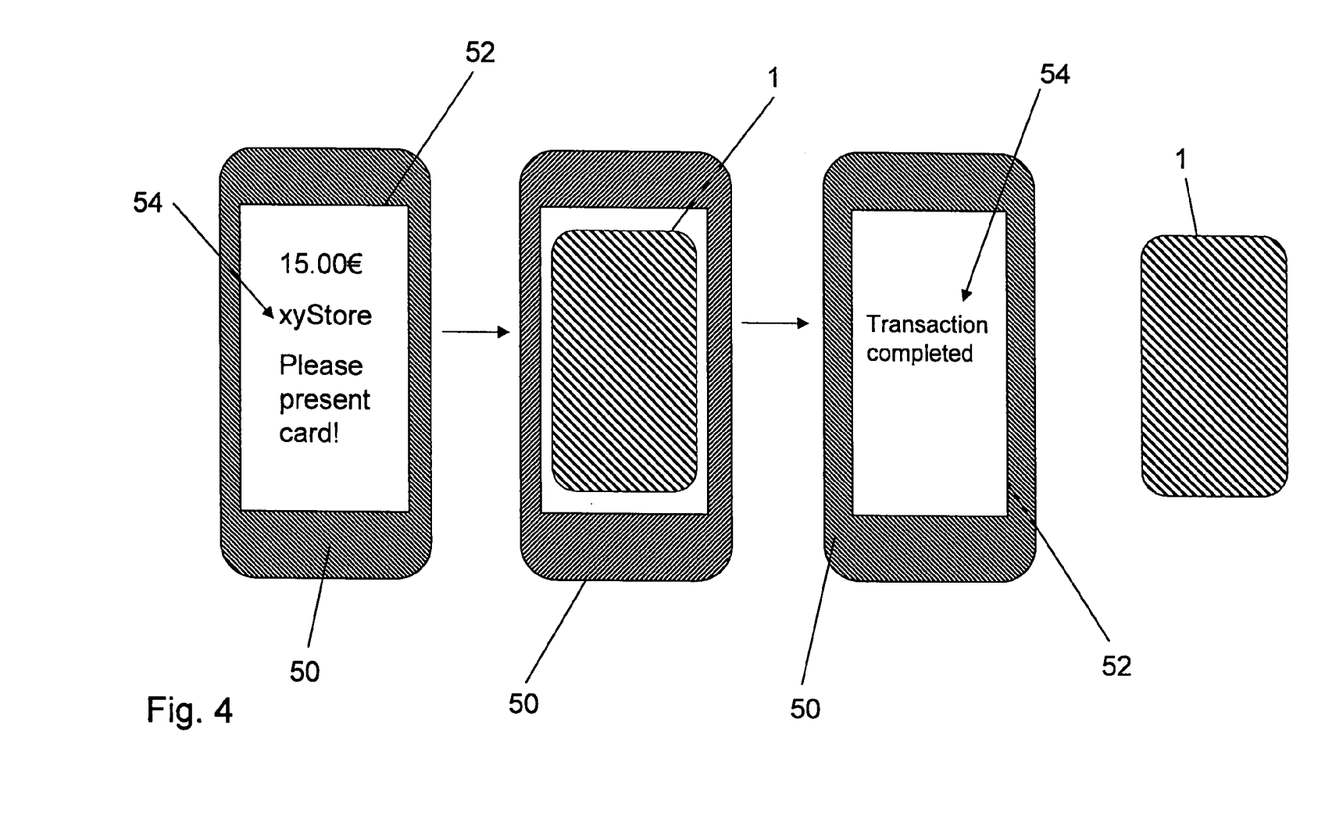

FIG. 3 illustrates, as an example of an electronic transaction, the inducement of the transfer of an amount of money on an end device 50 from a user's account to an account of a service provider, represented by a server, by means of a data carrier 1 configured in the format of a chip card; the chip-card embodiment is adopted here only for the purpose of description; other embodiments of the data carrier 1 are of course possible. The end device 50 has a capacitive display screen 52.

The transaction commences by the end device 50 generating information about the intended transaction on the display screen 52. By way of example there is represented on the capacitive display screen 52 an information item 54 communicating to the owner of the chip card 1 that a transaction performed by him has a value of e.g. € 15.00 and is being performed with a service provider "xyStore" in the form of a server (not shown). In order to complete the transaction, the user is requested by a display "Please present card" output on the display screen 52 to place his chip card 1 onto the display screen 52 of the end device 50. The user thereupon places his chip card 1 onto the capacitive display screen 52 and the transaction is executed as described more closely hereinafter. In order that the execution is possible, it can be provided that the user, by simultaneously touching the chip card 1 and the end device 50, at least temporarily establishes a physical contact between the two to thereby close a circuit. After the value transaction is carried out, the user is e.g. informed via the display screen 52 that the transaction has been successfully completed: "Transaction completed".

The exact execution of the transaction when the chip card 1 is placed on depends on how chip card 1 and end device 50 are exactly equipped. A first embodiment variant is based on a chip card 1 which has a transducer arrangement 10 as well as a window element 20. The end device 50 can be e.g. a mobile radio end device, a tablet PC or the like.

The transaction data are transmitted from the end device 50 to the server of the service provider. The latter forms for the transaction data a transaction information item specific to the transaction, for which a transaction number (TAN) will hereinafter be adopted by way of example, and subjects it to an image encryption executed with a card-specific window key. The image encryption has the effect that an unchanged graphical rendition of the image-encrypted transaction data on a display screen 52 is not readable. Likewise, the transaction data can also be image-encrypted. The server sends the image-encrypted transaction number and, where applicable, the image-encrypted transaction data via a separate communication channel back to the end device 50, which displays them on its display screen 52. The separate communication channel can be e.g. an SMS. The window element 20 of the data carrier 1 is configured for removing the image encryption, by a readable, understandable rendition of transaction number and, where applicable, transaction data being effected on the display screen 52 only in the case of correctly positioned superimposition. Such an encryption/decryption can be realized in a simple manner for example using a lens structure incorporated into the window element 20, which delivers a valid, readable image only when the graphical pattern to be rendered is represented on the display screen 52 in a manner specially coordinated with the lens structure.

In a modification of the first embodiment variant there is used a chip card 1 having a transducer arrangement 10 but not a window element. The transaction data are again transmitted to a server of a service provider, who forms a transaction number (TAN) for the transaction data and sends it via a separate communication channel back to the end device 50, which displays it on its display screen 52. In contrast to the first embodiment variant, there is no image encryption in this variant. Instead, the output of the transaction number and, where applicable, of the transaction data is effected in a certain relation to the chip card 1. The end device 50 for this purpose first determines the exact position of the chip card 1 on the display screen 52 and subsequently outputs the transaction number and, where applicable, the transaction data in coordination with the ascertained position such that they appear in a defined relation to the chip card 1 outside the area of the display screen 52 covered by the chip card 1. For example, the rendition of the transaction number and, where applicable, of the transaction data can be effected over a certain longitudinal edge of the chip card 1 in an alignment parallel to the longitudinal edge. The rendition can moreover be coordinated with markings provided on the chip card 1. A deviating alignment or a mismatch with the markings then indicates an impermissible, untrustworthy rendition.

In a second embodiment variant there is used a chip card 1 equipped only with a transducer arrangement, without a window element. The transaction data are now transferred from the end device 50 to the chip card 1 via a contactless interface of the chip card 1, e.g. the NFC interface. The chip card 1 thereupon generates e.g. a transaction number and sends it back to the end device 50 via the transducer elements. The end device 50 finally transfers the complete data, consisting of transaction number and transaction data, to a server for further processing.

A third embodiment variant is based on a chip card 1 which has a transducer arrangement as well as additionally a back channel. Via the back channel the end device 50 sends transaction data to the chip card. The chip card 1 thereupon generates e.g. a transaction number and sends it back to the end device 50 via the transducer arrangement. The latter subsequently passes it to the server of the service provider. If the chip card 1/data carrier 1 additionally has a window element, the latter can serve in a simple manner to prove the operability of the chip card 1, by the transaction data being so aligned that they appear exactly in the window element.

In an embodiment variant with the same data-carrier design, the transfer of the transaction data is effected not via the back channel, but via a contactless interface of the chip card 1, e.g. via an NFC interface 36, as indicated in FIG. 1. Via the back channel an authentication takes place between the chip card 1 and the end device 50. An authentication is expedient primarily when the end device 50 has a specially secured runtime environment, so that in particular the result of an authentication performed by such a secure runtime environment is trustworthy. Such secure runtime environments can be realized e.g. on a security element that is integrated but basically autonomous in relation to an end device 50, said security element being for example a SIM card.

Such an authentication through a secure runtime environment is further also expedient when the data carrier 1 does not enable a back channel via the display screen 52. The data exchange is then effected e.g. via a contactless interface to the chip card 1 and via the transducer arrangement to the end device 50.

The invention claimed is:

1. A method for interaction of a portable data carrier with an end device, wherein the data carrier comprises a transducer arrangement having at least one or a set of capacitive transducer elements arranged on or in the data carrier at defined positions in relation to the geometry of the data carrier, and the data carrier is supplied with energy; wherein the end device comprises a capacitive display screen having a touch-sensitive display, wherein the method comprises placing the data carrier onto the display screen and generating via the capacitive transducer elements signals picked up and evaluated as input signals by the end device, making available the energy required for driving the transducer elements by transmission from the end device via a contactless interface through inductive coupling, and the end device derives an exact position of the data carrier on the display screen through evaluation of the input signals, and performing, via the at least one or set of transducer elements, a signal exchange from the display screen to the data carrier, by test signal sequences being generated location-dependently through the display screen, said sequences being detected by the transducer elements operated as sensors, and evaluated as input signals through the data carrier.

2. The method according to claim 1, wherein the data carrier comprises a contact-type interface having several contact pads which are employed as part of the at least one or set of capacitive transducer elements on which the signals are generated for the display screen.

3. The method according to claim 1, wherein for driving the transducer elements a drive apparatus causes changes of charge in an order of magnitude of 1 pF to an order of magnitude of less than 2 pF on the at least one or set of transducer elements.

4. The method according claim 1, wherein the data carrier comprises a window element in relation to which the at least one or set of transducer elements are arranged at defined positions on or in the data carrier, wherein the end device, after deriving the exact position of the data carrier on the display screen, outputs a content information item which is correctly positioned relative to the window element.

5. The method according to claim 1, wherein the signal exchange is performed from the display screen to the data carrier by the data carrier being equipped with an acceleration sensor and the display screen being intermittently excited to vibrate, the vibrations being detected by the acceleration sensor and evaluated as input signals through the data carrier.

6. The method according to claim 5, wherein through the data carrier a transaction information item specific to the transaction is generated and transferred selectively via the contactless interface or the at least one or set of transducer elements to the end device, which transfers the transaction data together with the transaction information item to a server for further processing, in particular via a secure channel.

7. The method according to claim 1, wherein for carrying out a security-critical electronic transaction on the end device, transaction data are transferred to a server, which forms a transaction number and encrypts the transaction data as an image with a key specific to the data carrier and transfers the key to the end device together with the transaction data via a separate channel, the image-encrypted data being displayed on the display screen of the end device and a decryption of the image-encrypted data occurs when a window element of the data carrier is correctly positioned and superimposed with the image-encrypted data displayed on the display screen.

8. The method according to claim 7, wherein the transaction data are presented on the display screen of the end device such that they appear in the window element of the data carrier.

9. The method according to claim 1, wherein for carrying out a security-critical transaction on the end device, transaction data are transferred to the data carrier via the at least one or set of transducer elements.

10. The method according to claim 1, wherein a signal transmission from the data carrier to a display screen is only possible when a circuit between the data carrier and the end device is closed via the user.

11. A data carrier for interaction with an end device, comprising:
a transducer arrangement having at least one or a set of capacitive transducer elements arranged on or in the data carrier at defined positions in relation to the geometry of the data carrier;
a contactless interface via which energy is transmitted from the end device through inductive coupling, and
a drive apparatus connected to the contactless interface and configured for changing the charge state of the capacitive transducer elements in a targeted manner, and
wherein the at least one or set of transducer elements is configured to perform a signal exchange from a display screen of the end device to the data carrier, by test signal sequences being generated location-dependently through the display screen, said sequences being detected by the transducer elements operated as sensors, and evaluated as input signals through the data carrier.

12. The data carrier according to claim 11, which additionally comprises a window element in relation to which the transducer elements are arranged at defined positions on or in the data carrier.

13. The data carrier according to claim 11, which has a back contact area as well as a switch as a consent apparatus, the switch being connected to the back contact area and at least one transducer element, with a change of the potential of the at least one transducer element connected thereto being possible, through actuation of the switch, when a user produces an electrically conductive connection between back contact area and the end device by simultaneously touching an outside contact area connected to the display screen.

14. An end device for interaction with a data carrier according to claim 11, wherein the end device is configured for deriving an exact position of the data carrier on the display screen through evaluation of the signals of the at least one or set of transducer elements.

15. The end device according to claim 14, wherein the end device is configured for outputting on the display screen a content information item which is correctly positioned relative to a window element of the data carrier.

16. The end device according to claim 14, further comprising an outside contact area connected electroconductively to the display screen.

17. A system for interaction of a portable data carrier with an end device, comprising:
at least one data carrier comprising:
a transducer arrangement having at least one or a set of capacitive transducer elements arranged on or in the data carrier at defined positions in relation to the geometry of the data carrier;
a contactless interface via which energy is transmitted from the end device through inductive coupling, and
a drive apparatus connected to the contactless interface and configured for changing the charge state of the capacitive transducer elements in a targeted manner, and
a back contact area as well as a switch as a consent apparatus, the switch being connected to the back contact area and at least one transducer element, with a change of the potential of the at least one transducer element connected thereto being possible, through actuation of the switch, when a user produces an electrically conductive connection between back contact area and at least one end device by simultaneously touching an outside contact area connected to a display screen of the end device;
and the at least one end device wherein the at least one end device is configured for deriving an exact position of the data carrier on the display screen through evaluation of the signals of the transducer elements.

18. A method for interaction of a portable data carrier with an end device, wherein the data carrier comprises a transducer arrangement having at least one or a set of capacitive transducer elements arranged on or in the data carrier at defined positions in relation to the geometry of the data carrier, and the data carrier is supplied with energy; wherein the end device comprises a capacitive display screen having a touch-sensitive display,     wherein the method comprises placing the data carrier onto the display screen and generating via the capacitive transducer elements signals picked up and evaluated as input signals by the end device, making available the energy required for driving the transducer elements through an internal energy supply of the data carrier, and the end device derives an exact position of the data carrier on the display screen through evaluation of the input signals, wherein the data carrier comprises a window element in relation to which the at least one or set of transducer elements are arranged at defined positions on or in the data carrier, wherein the end device, after deriving the exact position of the data carrier on the display screen, outputs a content information item which is correctly positioned relative to the window element.

19. A data carrier for interaction with an end device, comprising:
    a transducer arrangement having at least one or a set of capacitive transducer elements arranged on or in the data carrier at defined positions in relation to the geometry of the data carrier;
    a dedicated energy supply, and
    a drive apparatus connected to the energy supply and configured for changing the charge state of the capacitive transducer elements in a targeted manner,
wherein the data carrier has a back contact area as well as a switch as a consent apparatus, the switch being connected to the back contact area and at least one transducer element, with a change of the potential of the at least one transducer element connected thereto being possible, through actuation of the switch, when a user produces an electrically conductive connection between back contact area and the end device by simultaneously touching an outside contact area connected to a display screen of the end device.

* * * * *